United States Patent [19]

Waite

[11] Patent Number: 5,147,553
[45] Date of Patent: Sep. 15, 1992

[54] SELECTIVELY PERMEABLE BARRIERS

[75] Inventor: Warren A. Waite, Burlington, Mass.

[73] Assignee: Ionics, Incorporated, Watertown, Mass.

[21] Appl. No.: 677,201

[22] Filed: Mar. 29, 1991

Related U.S. Application Data

[63] Continuation-in-part of Ser. No. 366,714, Jun. 15, 1989, abandoned, which is a continuation-in-part of Ser. No. 278,524, Dec. 1, 1988, Pat. No. 4,913,816, which is a continuation-in-part of Ser. No. 190,204, May 4, 1988, Pat. No. 4,802,984.

[51] Int. Cl.$^5$ ............................................... B01D 61/00
[52] U.S. Cl. .................................... 210/654; 210/490; 210/500.34; 427/245

[58] Field of Search ...................... 210/500.34, 500.41, 210/500.42, 490, 651, 652, 654; 423/445; 204/182.4; 264/41, 49; 427/245, 246

[56] References Cited

U.S. PATENT DOCUMENTS

| | | | |
|---|---|---|---|
| 3,615,024 | 10/1971 | Michaels | 210/500.41 X |
| 3,859,421 | 1/1975 | Hucke | 423/445 |
| 4,200,538 | 4/1980 | Seita et al. | 210/500.41 |
| 4,302,308 | 11/1981 | Keritsis | 204/182.4 |
| 4,737,325 | 4/1988 | Kamiyama et al. | 210/500.42 X |

Primary Examiner—Frank Spear
Attorney, Agent, or Firm—Norman E. Saliba

[57] ABSTRACT

Apparatus and process for separating a fluid mixture into less permeable and more permeable fractions employing novel selectively permeable barriers comprised of a porous, emulsion treated substrate and a non-porous selectively permeable barrier layer thereon.

16 Claims, No Drawings

SELECTIVELY PERMEABLE BARRIERS

This application is a continuation-in-part of U.S. patent application Ser. No. 07/366,714 filed Jun 15, 1989 and now abandoned, which, in turn, is a continuation-in-part of Ser. No. 07/278,524, filed Dec. 1, 1988, now U.S. Pat. No. 4,913,816, which, in turn, is a continuation-in-part of Ser. No. 07/190,204, filed May 4, 1988, now U.S. Pat. No. 4,802,984.

FIELD OF THE INVENTION

This invention pertains to apparatus for separating fluid mixtures into less permeable and more permeable fractions, said apparatus comprising inter alia a selectively permeable barrier which comprises a foraminous, emulsion treated substrate and a non-porous, selectively-permeable barrier layer thereon. Various embodiments of the apparatus are intended for example for reverse osmosis ("RO") also sometimes called piezo-osmosis ("PO"), hyperfiltration ("HF") or nanofiltration ("NF"), gas-separation ("GS"), pervaporation ("PV") often called membrane permeation ("MP"), dialysis ("DD"), electrodialysis ("ED"), reverse dialysis ("RD") also called piezodialysis ("PD"), preparative electrolysis and primary and secondary batteries.

BACKGROUND OF THE INVENTION

It is well-known in the fields of reverse osmosis (including nano-filtration), gas-separation, pervaporation, dialysis, preparative electrolysis, primary and secondary electric storage cells, electrodialysis and reverse dialysis that the resistance to permeation is inversely proportional to the thickness of the active barrier layer. (It also seems to be a fact of life that barrier layers which have high selective permeability also have high resistance per unit thickness to permeation. For example the $O_2/N_2$ separation factor for poly (2,6-dimethyl phenylene oxide) is about twice that of poly dimethyl siloxane but the $O_2$ flux of the latter per unit barrier layer thickness is only about one-fortieth of the former).
It is therefore economically important that the selectively permeable barrier layer be as thin as possible in order to reduce overall cost of the apparatus and energy consumed in overcoming resistance to permeation. The desired thin barrier layers naturally have a low burst strength (particularly when they are swollen with some permeants) and require support substrates with very small support spans (e.g. characteristic dimensions of the foramina). Most methods of preparing support substrates for barrier layers unfortunately lead to reduced total porosity when the characteristic dimensions of the foramina are reduced. Furthermore with some exceptions (e.g. track-etched substrates such as those microporous membranes trade-named Nuclepore and Thiele-type ionotropic gel membranes) such support substrates have a fairly wide distribution of the characteristic dimension of the foramina. (Nuclepore microporous membranes have an inherently low porosity and Thiele-type membranes are not commercially available). For example a well-known microporous membrane useful as a substrate is rated at 0.45 micrometers but has about 60 percent of its pores in excess of 0.45 micrometers and about 3 percent of the pores in excess of 2 micrometers. Under stress the barrier layer spanning the latter pores is that most likely to be ruptured. Hence the thickness of the barrier layer must be designed around the few large pores in the substrate leading to lower permeation rates (fluxes) than would otherwise be possible.

In accordance with this invention it has now been discovered that if the porous substrate is treated with an emulsion or latex appropriate under the circumstances before or during the process of affixing or forming the non-porous selectively permeable barrier layer thereon, superior apparatus for separating fluid mixtures into less permeable and more permeable fractions can be easily obtained. Otherwise it would require more rigorous preparation procedures, more careful selection of substrates and/or greater rejection of defective selectively permeable barriers. If the microporous substrate is prepared by phase inversion of a solution of a suitable polymer or mixture of polymers against an aqueous solution which is a poor solvent for such polymers then the emulsion or latex may conveniently be a component of such aqueous solution.

It is therefore an objective of this invention to provide improved apparatus for separating fluid mixtures into less permeable and more permeable fractions, said apparatus comprising at least one selectively permeable barrier which comprises a porous, emulsion treated substrate and a non-porous selectively permeable barrier layer thereon. This and other objectives will be obvious from the following detailed description of the invention.

DETAILED DESCRIPTION OF THE INVENTION

In accordance with the invention, a microporous substrate (generally having an average pore size in the range of from about 0.005 to about 0.5 micrometers) is treated with an appropriate emulsion or latex in water or other suitable liquid before or during the process of affixing or forming the non-porous selectively permeable barrier layer thereon. As will become clear from the following there are many possible choices of a substrate and of a barrier layer.

As is well known, barrier layers can be affixed to appropriate substrates for example by:
dipping the substrate into a casting solution;
spraying a casting solution onto the substrate;
kiss-coating or roll-coating a casting solution onto the substrate;
laminating one or more preformed barrier layers to the substrate;
depositing the barrier layer from a plasma onto the substrate;
interfacial (interphasal) polymerization between components dissolved in two substantially immiscible liquids, one of which is within at least one surface region of the substrate.

In the case of forming the barrier layer by dipping, roll-coating, spraying or kiss-coating, the substrate is preferably treated with a suitable emulsion before such coating is applied. It may be appropriate to fill at least the pores within the surface region to which the coating will be applied with an easily meltable or soluble material (such as sodium sulfate decahydrate, amyl stearate or tridecanol, aqueous carboxy methyl cellulose, or an aqueous, reversible, elastic gel of agar or agarose, gelatin and the like). The emulsion may be applied before the pores are filled or, in the case of the above mentioned aqueous gels, as a component of the gel.

In the case of laminating one or more preformed barrier layers to the substrate, the emulsion is preferably applied to the substrate before the lamination.

When the barrier layer is deposited from a plasma the emulsion is preferably applied to the substrate before the deposition of the barrier layer.

In the case of interphasal polymerization, the emulsion may be applied to the substrate before one of the phases is imbibed by the substrate or alternatively may form part of said phase.

Examples of emulsions contemplated in this invention include:

natural rubber latex;

acrylic latices (aqueous emulsions of copolymers of butadiene and acrylonitrile);

styrene rubber latices (aqueous emulsions of copolymers of styrene and butadiene or isoprene or of terpolymers of styrene, butadiene and vinyl pyridine);

aqueous emulsions of polyvinyl chloride or copolymers of vinyl chloride with vinyl acetate, with vinylidine chloride or with acrylic monomers;

latices of polyvinyl fluoride, polyvinylidene fluoride, poly tetrafluoroethylene, polytetrafluoroethylene-co-ethylene;

latices of polystyrene or of polyethylene;

artificial latices prepared from polyurethanes, polyesters, polypropylene, stereoregular polybutadiene or stereoregular polyisoprene, epoxy resins or resorcinol-formaldehyde copolymers;

inverse emulsions of polymers or copolymers of water miscible monomers such as sodium vinyl benzene sulfonate, 2-sulfoethyl methacrylate, 2-acrylamido-2-methyl-propylenesulfonic acid, acrylamide, acrylic acid or methacrylic acid.

Either negatively charged or positively charged emulsions may be used.

The mechanisms by which the emulsions are effective in this invention are not clear. Although it is not intended that the scope of the invention be limited by the following speculations it may be among other things that the emulsion particles, (generally in the range of from about 0.05 to about 0.15 micrometers) plug or bridge-over large pores in the porous substrate or form a permeable layer on or within the substrate. The particles may also form sinks and gutters to carry and direct permeate from the barrier layer to pores in the substrate. Alternatively or in addition, when the barrier layer is formed by casting or interfacial polymerization, some of the emulsion particles may become an integral part of the barrier layer mechanically reinforcing it. This can particularly be the case when the barrier layer forming materials wet the emulsion particles or are sorbed thereby. It will be clear that the chemical composition of the particles strongly affects their adhesion to or sorption by the substrate, and wetting or swelling of the emulsion particles by the barrier layer forming materials. The emulsions may also contribute other desirable properties to the barrier such as providing a sink for oxidants.

The principal applications of the apparatus of this invention are believed to be those in which solution-diffusion processes supply the major separation mechanism. In such applications a first fluid mixture (e.g. a gaseous and/or liquid mixture) is contacted with a first face of a suitable barrier layer and a second fluid mixture is contacted with the second face of such layer. The barrier layer is characterized by permitting: (a) sorption in the first face of at least one component of the first fluid mixture; (b) diffusion of said one component across the thickness of the barrier layer; and (c) desorption of said one component into said second fluid mixture. A chemical potential gradient for said one component is then applied across the barrier layer, the potential in the first fluid mixture being greater than in the second. It is clear from this description that: (a) all the applications contemplated by this invention are closely related even though different names are generally given to emphasize immediately perceived differences; and (b) there may be applications which can equally well be classified by two or more process names. It is also clear that the overall rate of migration of said one component from the first fluid mixture to the second is dependent upon (inter alia):

1. Extent and rate of sorption of said one component in said first face.

If either extent or rate of sorption are low then the overall migration rate of said component will be low regardless of the diffusion rate of said component in said barrier layer or desorption rate into said second fluid mixture. The extent and/or rate of sorption of said one component may be low, for example, because its concentration (strictly: activity) in said first fluid mixture is low, leading e.g. to low swelling of said first face and/or low rate of transfer of said one component to said first face. Said one component may appreciably swell or plasticize said first face and in doing so permit sorption of other components from said first fluid mixture into said face. By way of example, liquid water and water vapor are not appreciably sorbed by a polyethylene barrier but will swell or even dissolve barrier layers of polyvinyl alcohol, some polyamides and polyvinyl pyrrolidone. Such swelling may be restrained by incorporating crosslinks in the barrier layer, by blending (alloying) the material of the barrier layer with substances (e.g. polymers) which are not swollen by said one component, by reducing the concentration of moieties (affinity moieties) in said barrier layer with which said one component has an affinity (e.g. when said one component is water, reducing the concentration of hydrogen-bonding and/or ionizable moieties), by inducing the formation of microcrystals in the material of the barrier layer (though in the case of some one components said microcrystals are also dissolved). Generally the concentration of affinity moieties and extent of crosslinking and microcrystallinity should together limit the components sorbed from said first fluid mixture to the range of from about 0.01 to about 0.1 grams fluid mixture per $cm^3$ surface region of said layer in the steady state operating condition. (It will be understood that in some relatively simple separations, e.g. the low pressure softening of hard, potable water, the amount of sorbed components may successfully be substantially greater e.g. up to 0.5 grams fluid mixture per $cm^3$ surface region. Further in the case of the so-called permanent gases it may be difficult at ordinary temperatures and reasonable pressures to obtain loadings as high as 0.1 gram per $cm^3$). Further the characteristic dimensions of the interstices in the surface region of said barrier in the steady-state under operating conditions should generally be in the range of from about 2 to about 20 Angstroms. To achieve such goals it may be necessary to incorporate in the barrier layer, during formation of crosslinks and/or microcrystallinity, swelling agents or plasticizers (including polymeric plasticizers) which are later replaced with components of said first fluid mixture or other components miscible in said first fluid mixture.

2. Rate of diffusion of said one component in said barrier layer.

Generally the rate of diffusion of said one component increases as its diameter decreases. However among components having substantially the same diameter those of greater length (greater aspect ratio) will generally diffuse less rapidly. Components having great lengths (e.g. polymers) may not diffuse at all even though they have small diameters in the extended (e.g. solvated) form and appreciable sorption (so-called "snake-cage" effect). The interstices in the material of the barrier layer must be appreciably larger than the characteristic dimension of the diffusing component (e.g. said one component) or (in the case of barrier layer materials above their glass-transition temperatures) must be capable of providing cavities larger than said characteristic dimension by random movements of segments of such barrier layer materials under the influence of thermal agitation. In some instances (e.g. water permeating through polydimethyl siloxane) the overall permeability can be quite high, even though the extent of sorption is low, owing to exceptionally large diffusion coefficients. In some processes (e.g. pervaporation) the rate of desorption of sorbed components into said second fluid mixture in contact with the second face of the barrier layer can be so high and/or the chemical potential of the desorbed components in said second fluid mixture so low that said second face is essentially free of sorbed components. In such case the overall rate of migration of said one component (and other components) may be almost entirely determined by the (slow) diffusion in said second face. Small molecules (e.g. water) and molecules having high affinity for the material of the barrier layer will then be favored.

3. Extent and rate of desorption of said one component out of said second phase into said second fluid mixture.

If either the extent or rate of desorption are low then the overall migration rate of said component will be low regardless of the diffusion rate of said component in said barrier layer or sorption rate from said first fluid mixture into said barrier layer. The extent of desorption may be low because the chemical potential of said one component in said second fluid mixture is not sufficiently low compared to the chemical potential in said second face of said barrier layer. This may for example be due to lack of sufficient diffusion and convection to remove said desorbed one component from the vicinity of said second face. On the other hand (as mentioned above) the chemical potential of said one component in said second fluid mixture may be so low that there is essentially no sorbed component(s) in said second face resulting in very low diffusion rates in said face.

Selectively Permeable Barriers Suitable for Reverse Osmosis Apparatus including Apparatus for Low Pressure Reverse Osmosis, Nanofiltration and Pressure Membrane Softening of Potable Water Under this title are subsumed applications ranging from the one stage production of potable water from seawater at pressures up to 100 atmospheres to the softening of potable water at pressures down to 3 atm. Suitable substrates for the barrier layer include those well known in the art such as microporous filter media prepared from:

polysulfone ("PS"), e.g. Udel P-3500 (Amoco Performance Products), for example by phase inversion from solution in N,N-dimethyl acetamide and the like against dilute aqueous emulsions;

polyarylsulfone ("PAS"), e.g. Astrel 360 (Carborundum Co.), also prepared by phase inversion;

polyether sulfone ("PES"), e.g. Victrex PES600P (ICI PLC), prepared by phase inversion;

polyphenylsulfone ("PPS"), e.g. Radel (Amoco Performance Products), prepared by phase inversion;

polypropylene by thermal phase inversion; e.g. Accurel (Enka Produktgruppe Membrana) or by mono- or bi-axial stretching e.g. Celgard (Celanese Plastics) or Poreflon;

cellulose e.g. from cuprammonium, viscose, N-methyl morpholine N-oxide, lithium chloride-N,N-dimethylacetamide or lithium chloride-N-methyl-2-pyrrolidone casting solutions;

polycarbonate, polyphenylene oxide or polyvinyl chloride;

cellulose nitrate or cellulose acetate-nitrate;

interwoven or felted fibers of paper, plastic (e.g. cellulose esters) or glass including filter paper (particularly suitable for low pressure reverse osmosis);

microporous ceramics, graphite or stainless steel;

polyvinylidene fluoride or polytetrafluoroethylene-co-ethylene.

Suitable barrier layer materials include for example:

cellulose acetate (e.g. the 2.5 acetate) and/or mixed cellulose esters (e.g. cellulose acetate-butyrate, cellulose acetate-benzoate, cellulose acetate-sorbate, cellulose acetate-propionate) which may be dip-, roll-, spray- or kiss-coated from e.g. acetone;

cellulose triacetate which may be coated from e.g. methylene chloride;

sulfonated polysulfone including blends with polysulfone;

polyfuran including sulfonated polyfuran;

sulfonated polyphenylene oxide including blends with poly phenylene oxide;

polyacrylonitrile;

ethyl cellulose-polyacrylic acid interpolymers;

polymers containing the group -CONR- (where R may be hydrogen or an organic moiety) and including the alkyl, alkylaryl and aryl amides (aramides), polyamide hydrazides, polybenzimidazoles, polyimides, poly-2,4-imidazolidinediones, (poly hydantoins), polypyrrones, polybenzimidazolones, polyureas, polyurethanes (polycarbamates), polyether ureas, polyether amides, polyether hydantoins, and the like. In general these may be cast from solutions in N,N-dimethyl acetamide ("DMAc"), N-methyl pyrrolidone ("NMP") or dimethyl sulfoxide ("DMSO") and often prepared by interfacial polymerization. After casting or interfacial polymerization such barrier layers may be cross-linked and/or treated in ways well-known in the art to replace labile hydrogen.

Preferred barrier layers belonging to such last mentioned group include for example but without limitation:

piperazine, 2-methyl piperazine, 2,5-dimethyl piperazine, homopiperazine (hexahydrodiazepine), and/or N,N' diphenyl ethylene diamine isophthalamide, terephthalamide, benzene-1,3,5-tricarboxamide (trimesoylamide) and/or cyclohexane-1,3,5-tricarboxamide (hexahydrotrimesoylamide);

piperazine, 2-methyl piperazine, 2,5-dimethyl piperazine, homopiperazine, and/or N,N' diphenyl ethylene diamine 2,5-furan dicarboxamide, 3,4-furandicarboxamide, 4,5-thiazole dicarboxamide, 2-phenyl-1,3-thiazole-4,5-dicarboxamide, 3,4-furazan dicarboxamide, 1-benzyl-1,2,3-triazole-4,5-dicarboxamide, 2,4-pyridine dicarboxamide, 2,5-pyridine dicarboxamide, 2,3-pyrazine dicarboxamide, 3,4-thiofurazan dicarboxamide, fumaramide, mesaconamide, adipamide, 1,7-heptanedicarboxamide and/or 1,10-decanedicarboxamide; metaphenylenediamine, metaxylylenediamine, paraphenylene diamine, 4-chloro-metaphenylene diamine, and/or 5-chlorometaphenylene diamine isophthalamide, terephthalamide, benzene-1,3,5-tricarboxamide, and/or cyclohexane-1,3,5-tricarboxamide;

polyamide products comprising at least one moiety from each of the following groups:
a) metaphenylene diamine, metaxylylene diamine, paraphenylene diamine, 4-chloro metaphenylene diamine, 5-chloro metaphenylene diamine, 1,3,5-benzene triamine, bis (amino benzyl) aniline, tetraaminobenzene;
b) 2,4-diamino benzene sulfonic acid (metaphenylene diamine-4-sulfonic acid), 4,4'-diaminodiphenyl ether-2,2'-disulfonic acid, trimellitic anhydride acid halide, trimesoyl chloride;
c) isophthaloyl chloride, terephthaloyl chloride, trimesoyl chloride, pyridine dicarboxylic acid chloride, cyclohexane-1,3,5-tricarboxylic acid chloride;

polyamide or polyurea products comprising at least one moiety from each of the following groups:
d) polyethyleneimine or reaction products of ethylene diamine, piperazine, 2-methyl piperazine, 2,4-dimethyl piperazine, homopiperazine (hexahydrodiazepine) with a polyepihalohydrin;
e) isophthaloyl chloride, terephthaloyl chloride, trimesoyl chloride, pyridine dicarboxylic acid chloride, cyclohexane-1,3,5-tricarboxylic acid chloride, toluene diisocyanate, 4,4'-methylene bis (phenylisocyanate), polymethylene bis (phenylisocyanate), 1,5-naphthalene diisocyanate, bitolylene diisocyanate, hexamethylene diisocyanate, meta phenylene diisocyanate, sebacic acid chloride, azelaic acid chloride, adipic acid chloride, dodecanedioic acid chloride.

reaction products of epihalohydrin or polyepihalohydrin and 5,5-substituted hydantoins such as the 5,5-dimethyl, 5-ethyl-5-methyl, 5,5-diphenyl or 5,5-pentamethylene derivatives.

reaction products of phenylene diamines (and/or chlorophenylene diamines and/or xylylene diamines) and amino benzamides with benzene dicarboxylic acids or with benzene dicarboxylic acid chlorides and/or benzene tricarboxylic acid chlorides, benzene tricarboxylic acid anhydride chlorides, benzene tetracarboxylic acid anhydrides or chlorides;

reaction products of amino benzhydrazides (with or without phenylene diamines, chlorophenylene diamines, xylylene diamines and/or aminobenzamides) and benzene di- or poly-carboxylic acids or acid chlorides;

reaction products of 2,5-bis (alkylamino) paraphenylene diamine and terephthalic acid or terephthaloyl chloride;

reaction products of urea, thiourea, guanidine, isocyanuric acid, ammelide, melamine, benzoguanamine, hydantoin, dicyandiamide and/or acetoguanamine with formaldehyde, furfural and/or gloxal, optionally with polyhydric alcohols such as condensation products of phthalic anhydride with ethylene glycol or glycerin;

condensation products of 1,3-bis (hydroxy methyl)-2-imidazolidinone, 1,3-bis (hydroxy methyl)-tetrahydro-2-(1H)-pyrimidone and/or dimethyloldihydroxyethylene urea;

polyvinyl pyrrolidone-polyisocyanate interpolymers.

Preferred barrier layer materials for reverse osmosis depend strongly on the details of the projected application. For example, for demineralization of seawater preferred materials include condensation products of meta phenylene diamine and benzene-1,3,5-tricarboxylic acid chloride. For the softening of potable hard water at low pressure differentials modified urea-formaldehyde and related products may often be suitable as well as aliphatic polyamides, cellulose acetates, ethyl cellulose-polyacrylic acid interpolymers, polyvinyl pyrrolidone-polyisocyanate interpolymers. Sometimes the water which it is desired to process will contain small quantities of chlorine, hypochlorite, hypochlorous acid, chloramines, hypobromite and/or hypobromous acid. Generally it is convenient to remove such by filtration through activated carbon including silvered activated carbon or by addition of sulfite. In home water systems activated carbon (including silvered activated carbon) will frequently be installed upstream of a reverse osmosis module to remove organic matter and prevent fouling of such module. Such activated carbon will generally adequately remove available chlorine and if silvered will inhibit growth of microorganisms in the R.O. module. In those circumstances in which it is not convenient to remove active ("available") chlorine the barrier layer material and the substrate should be resistant to such forms of chlorine. Generally active chlorine attacks sites occupied by "active H", i.e. hydrogen which in principle can be replaced by elemental sodium. An example is

where H is active H. Less active H is found in

and more active H in

If such active H is replaced for example by alkyl, alkoxyalkyl, aryl or aryl alkyl groups, attack by active Cl will be reduced. Thus the following polymers, for example, would be expected to have increased resistance to active Cl:

condensation products of piperazine or N,N'-dimethyl ethylene diamine with isophthaloyl chloride and/or benzene-1,3,5-tricarboxylic acid chloride;

condensation products of urea and formaldehyde;

condensation products of 5,5-substituted hydantoins with epichlorohydrin.

Selectively Permeable Barriers Suitable for Gas-Separation Apparatus

Suitable substrates and emulsions include those mentioned above. Suitable barrier layer materials include for example:
polyvinylammonium chloride or thiocyanate
polytrimethylsilylpropyne
polysulfone
polyether sulfone
polyaryl sulfone
plasticized silicone rubber
polycarbonate/silicone rubber blends
plasticized polyurethane e.g. with N-cyclohexyl-2-pyrolidone
polychlorotrifluoroethylene
polyethylene terephthalate
nylon 6
polyvinyl chloride and polyvinylidene chloride
polyvinyl acetate including copolymers with vinyl chloride
cellulose acetate
butadiene-acrylonitrile copolymers
polyethyl methacrylate
polypropylene and polyethylene
polyvinyl butyral
butyl rubber (polyisobutylene-isoprene)
methyl rubber (polydimethyl butadiene)
neoprene (i.e. polychloroprene)
buna S(polystyrene-butadiene)
polybutadiene
natural rubber (polyisoprene)
plasticized ethylcellulose
polystyrene
polyphenylene oxide
poly (4-methyl pentene-1)
polydimethyl siloxane (i.e. silicone rubber)

Trade named materials which are suitable for gas separation barrier layers include:
Pliofilm FM or P4 (Goodyear Tire and Rubber Co., Akron, Ohio, U.S.A.),
Hycar OR15 or 25 (Ciago b.v., Arnhem, Holland)
Vulcaprene
Hydropol (hydrogenated polybutadiene)

Suitable substrates and barrier layers depend strongly on the details of the separation and may be selected based on known simple tests within the skill of practitioners in the art. For example, Buna S and polybutadiene are quite useful for separating mixtures of carbon dioxide and nitrogen gases and polychloro-trifluoroethylene, polyvinyl acetate, cellulose acetate, polyethyl methacrylate and polypropylene for separating mixtures of helium and oxygen gases.

Selectively Permeable Barriers Suitable for Pervaporation Apparatus

Two modes of PV may be distinguished:

I. A liquid mixture is contacted with the first face of the barrier layer. Components therein are sorbed by the barrier layer, diffuse across its thickness and are desorbed into a second fluid mixture in which the sorbed components have a lower chemical potential. The latter may be provided if the second fluid mixture is a dilute solution of the desorbed components in a liquid which is not significantly sorbed by the second face of the barrier layer. Such liquid is often referred to as a "sweep-liquid". Alternatively the lower chemical potential may be provided if the second fluid mixture is a dilute mixture ("solution") of the desorbed components in a gas or vapor which is not significantly sorbed by the second face of the barrier layer. The lower chemical potential can also be provided by reducing the pressure in the second fluid mixture below the total vapor pressure of the sorbed components. Using either of the last two methods there can be a substantial heat of desorption of the components from the sorbed state to the vapor state.

II. A vapor mixture (or liquid-vapor mixture) is contacted with the first face of the barrier layer. In this case there can be a substantial heat of sorption of the components from the vapor state to the sorbed state. The sorbed components diffuse across the thickness of the barrier layer and are desorbed into the second fluid mixture. In this mode much of any required heat of desorption is provided by diffusion of the above mentioned heat of sorption across the thickness of the barrier layer.

It will be clear that Mode II is closely related to GS (Gas Separation). In the latter, gas is sorbed by the barrier layer emitting a heat of sorption (e.g. in the case of propylene permeating amorphous polyethylene about 3 kilogram calories per mole of propylene) and taking up substantially the same amount of heat on desorption as a gas. Mode II is also related to RO. In the latter, water (for example) is sorbed by the barrier on the high pressure face entailing a negative or positive heat of absorption (water sorption is temperature dependent), diffuses across the thickness of the barrier layer and desorbs at the low pressure face of the barrier. The driving mechanisms are also similar: The driving force per mol in the case of isothermal pervaporation is $$RT\ln\frac{\Psi_1}{\Psi_2} = RT\ln\frac{a_1}{a_2}$$

where R is the universal gas constant (e.g. in kilo Watt hours per gram mole per degree Kelvin or liter atmospheres per gram mole per degree Kelvin), $\Psi_1$ and $a_1$ are the vapor pressure and the activity of the permeating component at the first face of the barrier layer and $\Psi_2$ and $a_2$ values of such quantities at the second face of the barrier layer. In the case of isothermal gas separation the driving force per mol is $$RT\ln\frac{P_1}{P_2} = RT\ln\frac{a_1}{a_2} = RT\ln\frac{C_1}{C_2} = RT\ln\frac{\overline{V}_2}{\overline{V}_1}$$

where $P_1$, $a_1$, $c_1$, and $\overline{V}_1$ are the partial pressure, the activity, the concentration and the volume per gram mol of the permeating component at the first face and the quantities with 2 as subscript values of such quantities at the second face of the barrier. In the case of isothermal RO the driving force is $$RT\ln\frac{\Psi_1}{\Psi_2} = \overline{V}(P - \pi)$$

where $\Psi_1$ and $\Psi_2$ are the actual vapor pressures of water (or other permeating liquid) at the first and second faces of the barrier layer resp., $\overline{V}$ is the partial molar volume of water (or such other liquid), P is the pressure difference across the barrier layer and $\pi$ the so-called osmotic pressure difference across the barrier layer equal to $$\frac{RT}{V} \ln \frac{\psi_1'}{\psi_2'}$$

where $\psi_1'$ and $\psi_2'$ are the vapor pressures of the water at the first and second faces when the applied pressure at each face is zero gauge.

Hence it is not surprising that materials useful in each process depend not so much on the process as on the components to be separated. In gas separation and reverse osmosis special attention must of course be given to resist the pressure stresses. In general therefore the materials listed above which are useful in RO and GS are also useful in PV for similar separations and vice versa. In particular the following are useful:

polyvinyl alcohol-polyacrylonitrile composites for dehydration of water-alcohol mixtures near or at the azeotrope;

cellulose prepared by the viscose, cuprammonium, N-methyl-morpholine N-oxide, lithium chloride/N,N-dimethylacetamide or lithium chloride/N-methyl-2-pyrrolidone processes;

polyethylene and polypropylene;

Nylon, e.g. Nylon 6

Cellulose acetate

Selectively Permeable Barriers Suitable for Electrodialysis Apparatus

Apparatus according to this invention is suitable for ED in those cases in which the microporous barrier substrate does not contribute to an undesirable concentration gradient, for example in seawater concentration, in water-splitting (i.e. $OH^-/H^+$ generation) or in selective ion removal from dilute solutions, e.g. nitrate from potable water. In the first case the concentrate (brine from seawater) is formed solely by ion and water transfer through the selectively permeable (i.e. ion selective) barriers. The specific electrical resistance of conventional membranes for seawater concentration is typically in the range of from about 100 to about 150 ohm cm whereas the specific electrical resistance of seawater is about 20 to 25 ohm cm and of brine about 5 ohm cm. If the brine and seawater chambers are each about 0.030 cm thick and the conventional membranes each about 0.015 cm thick then it is easily seen that a large fraction of the electrical resistance of the apparatus resides in the membranes. The barrier resistance can be substantially reduced by forming thin ion selective barrier layers of 0.001 cm or even less on relatively open microporous substrates. The first face of the barrier layer should be in direct contact with (juxtaposed to) the seawater and the second face on or in the substrate. In this case the interstices in the support substrate (not occupied by barrier layer) will be filled with electrically transported ions and water and there will not be a significant concentration gradient in such substrate. Nevertheless it is preferred that said first face be univalent (monovalent) ion-selective to avoid the precipitation of calcium sulfate and other poorly soluble salts. Such thin barrier layers can be optimized to have higher ion-selectivity than conventional seawater concentration ion-exchange membranes even at the expense of high specific electrical resistance.

Suitable ion-selective barrier layer materials are described for example in U.S. Pat. Nos. 3,510,417; 3,647,086; 3,847,772 and 3,868,314. For example, a paste may be made of one part of polyvinyl chloride powder, 0.9 parts of styrene monomer, 0.1 part of 50% divinyl benzene of commerce, 0.3 part of dioctyl phthalate and 0.01 part of benzoyl peroxide. The paste is coated on cellophane film to a thickness of about 0.4 mil and a suitable microporous, emulsion treated substrate pressed into the coating. The opposite face of the substrate is covered with a glass plate and/or cellophane film and the resulting sandwich cured for 3 hours at 110° C. The resulting barrier is sulfonated for 24 hours in 98% sulfuric acid at 50° C. and after rinsing with saturated salt solution, half-saturated, quarter-saturated and synthetic seawater, is contacted on the barrier layer first face with a solution of poly-2-vinyl pyridine hydrochloride in synthetic seawater. Alternatively a suitable microporous substrate is heated with a 1 percent dispersion of a polymeric latex consisting of 30 parts of styrene and 70 parts of butadiene. A thin film of undiluted latex is then applied to one surface of the substrate with a roller. The barrier layer is allowed to dry in air and then sulfonated for 5 hours at 30° C. with 95% sulfuric acid, placed in saturated salt solution which is slowly diluted with water to about 3.5%. The first face of the barrier layer is then treated with a dilute aqueous solution of poly-2-vinyl pyridine of which about half the pyridine groups have been converted to pyridinium. The solution also contains about 3.5% salt. As a third alternative, for example, a paste of 1 part of polyvinyl chloride powder, 1.5 parts 4-vinyl pyridine, 0.1 part 50% divinyl benzene of commerce, 0.3 part dioctyl phthalate and 0.02 part benzoyl peroxide is spread as a thin film with a roller on one surface of a suitable microporous substrate which has been previously treated with a 1% aqueous dispersion of a styrene-butadiene-vinyl pyridine terpolymer. The substrate is then covered on both sides with cellophane film and cured by heating for 3 hours at 90° C. The substrate is then soaked for 24 hours in a mixture of 2 parts of methyl iodide and 8 parts of methanol and subsequently rinsed with dilute hydrochloric acid. The first face of the barrier layer is treated with a dilute solution of sodium polystyrene sulfonate having a molecular weight of about 8,000, said solution also containing about 3.5% salt.

In a second case such ion-selective barriers are useful in water-splitting apparatus, i.e. $OH^-/H^+$ generators. For example the barrier may consist of a microporous substrate having a barrier layer on one side, said layer containing a mixture of quaternary and non-quaternary ammonium groups. When said barrier is placed in an ED apparatus with the layer facing the positively charged electrode, it will be found that such barrier injects hydrogen ions into the side of substrate opposite the layer and emits hydroxide ions from the first face of the layer i.e. that face facing the positively charged electrode. For example, a substrate having a residual thickness of about 0.5 mm (i.e. the thickness not occupied by anion-selective barrier layer) can generate hydrogen ions into an about one normal solution of hydrochloric acid with substantial current efficiency at a current density of about 100 amperes per square foot. A suitable barrier material in this case is prepared for example by adding about 0.82 grams of a mixture of 3 moles of N,N-dimethyl-1,3-propane diamine and 1 mole of N,N,N',N'-tetramethyl-1,6-hexane diamine to about 10 grams of a 15% by weight solution of a styrene-vinyl benzyl chloride copolymer having a vinyl benzyl chloride content of about 35% by weight. After mixing for about half a minute the mixture is coated with a roller on a suitable substrate which has been previously treated with about a 1% aqueous dispersion of an acrylic latex. After several minutes the barrier is placed in an oven at about 125° C. for about 8 minutes.

Alternatively the barrier may comprise a mixture for example of carboxylic and sulfonic acid moieties in which case the first face of the barrier should face the negatively charged electrode.

In a third case such ion-selective barriers are useful in the selective removal by electrodialysis of one ionic species compared to other ionic species of the same charge sign, e.g. the selective removal of nitrate from drinking water. The barrier may consist of a microporous substrate having a barrier layer on one side, said layer comprising a thin, dense, non-porous, water-insoluble, hydrophobic charged film preferably having a dielectric constant in the range of from about 2 to about 7. Such barrier may be prepared for example by masking a microporous substrate (which has been treated with emulsion) with carboxymethyl cellulose, then immersing the substrate into a suitable casting solution and pulling it out at a controlled rate, e.g. 1 cm per minute, thereafter allowing the solvent to evaporate. The casting solution may consist for example of a mixture of 40 parts by volume of formamide and 60 parts of acetone containing from about 2.5 to 25 weight-/volume percent cellulose acetate and from about 1 to about 100% by weight on the cellulose acetate of:
a) tetra-pentyl, -hexyl-, or -heptyl ammonium bromide, or
b) polyvinyl benzyl trioctyl or tributyl ammonium chloride, or
c) various positively charged dyes.

Selectively Permeable Barriers Suitable for Electrolysis Apparatus

An important application of such apparatus is the electrolysis of sodium chloride brines to concentrated sodium hydroxide solution and chlorine and hydrogen gases. Less often such apparatus is used to produce potassium hydroxide solution and said gases from potassium chloride brines. Conventional apparatus for this purpose typically consists of an anode and a cathode separated into anode and cathode compartments respectively by cation-selective perfluoro ionomer membranes. Brine is maintained in the anode compartment at a concentration in excess of about 3 gram-equivalents per liter and alkali metal hydroxide is generally maintained in the range of from about 6 to about 15 gram-equivalents per liter. Two classes of perfluoro ionomer membranes are generally in use. In one of these classes a dense thin layer of carboxylic acid ionomer is supported on a less dense (but not porous) thicker layer of carboxylic or sulfonic acid ionomer. Generally the membrane is also reinforced with woven or non-woven fabric usually of polytetrafluoroethylene. In use the dense layer faces the cathode. The less dense layer and reinforcing fabric increase the electrical resistance of the apparatus but are regarded as necessary evils since the tear strength of the dense layer is marginal. Further if the transport number of alkali metal cations is less in the less dense layer than in the more dense layer then the former constitutes a diffusion layer resulting in concentration polarization at high current densities.

In the second of the above mentioned classes the entire perfluoro membrane consists of dense carboxylic acid ionomer (i.e. there are no significant variations in water content across the thickness of the membrane). Such membranes are also fabric reinforced for strength. The increased thickness of the dense ionomer and the fabric both contribute to increased electrical resistance of the membrane compared to the minimum thickness of dense carboxylic ionomer necessary to assure high electrical current efficiency.

According to the present invention a barrier selectively permeable for alkali metal cations and suitable for apparatus for the electrolysis of alkali metal halides is prepared from suitable microporous substrates which have been treated with appropriate emulsions by affixing to one surface of the so-treated substrate a thin, dense barrier layer selectively permeable for alkali metal cations. Such layer may be as thin as about 10 micrometers (0.4 mils) or even thinner and still provide high electrical current efficiency and low electrical resistance. In this case the barrier layer preferably faces the anode. The interstices in the substrate not filled with the barrier layer then face the cathode and are filled with alkali metal hydroxide solution. The substrate should be substantially inert to hot alkali metal hydroxide and may for example be prepared by controlled stretching of polytetrafluoroethylene film both uniaxially and biaxially as described for example in U.S. Pat. Nos. 3,953,566 and 3,962,153. It may be prepared by the consecutive steps of cold stretching, hot stretching and heat setting of polypropylene film as described for example in U.S. Pat. No. 3,801,404 or by the thermal phase inversion of polypropylene dissolved in a suitable hot solvent such as tallow amines. A suitable barrier layer consists of a copolymer of methyl perfluoro-6-oxa-7-octenoate, methyl perfluoro-5-oxa-6-heptenoate and/or methyl perfluoro-5,8-dioxa-6-methyl-9-decenoate with tetrafluoroethylene which barrier layer has been hydrolyzed with for example sodium methylate or sodium hydroxide to the carboxylate form. Part of the tetrafluoroethylene may be replaced with perfluorovinyl methyl ether. The preferred equivalent weight of the copolymer or terpolymer depends upon the application (e.g. sodium hydroxide or potassium hydroxide), desired concentration of the alkali metal hydroxide, nature of the ionomer(s) and of the co-monomers.

For example a copolymer having about 20 mol percent methyl perfluoro-5-oxa-6-heptenoate and about 80 mol percent tetrafluoroethylene when hydrolyzed will have a high current efficiency when the cathod compartment contains about 13 to 13.5 gram-equivalent of sodium hydroxide per liter and the anode compartment about 3.5 gram-equivalent of sodium chloride per liter. The copolymer may be dissolved preferably in Freon 114B2 (sym-dibromo tetrafluoroethane, b.p. 47.3° C.) or Freon 113(1,2,2-trichloro trifluoroethane, b.p. 47.6° C.) by ball milling. The solution is then coated as a thin layer on aluminum foil and the substrate evenly pressed on the thin layer. Optionally, if the substrate is microporous polytetrafluoroethylene, the substrate and barrier layer may be heated for about 5 minutes at 260° C. or at a compression pressure of about 3.5 bars at 260° C. for about half a minute. Other suitable solvents include perfluoro methylcyclohexane, perfluorodimethyl cyclobutane, perfluorooctane, perfluorobenzene and 2,3-dichlorofluoro butane. The substrate may be treated with a dilute aqueous dispersion of for example polytetrafluoroethylene, polyvinyl chloride, polyvinylidene chloride, polypropylene (in the form of a dilute artificial latex), polyvinylidene fluoride, neoprene, polystyrene, polystyrene-co-butadiene, polyisobutylene-co-isoprene (artificial butyl rubber latex), ethylene-propylene-diene rubber artificial latex or chlorosulfonated polyethylene artificial latex.

Selectively Permeable Barriers Suitable for Primary and/or Secondary Electric Batteries Many primary and secondary batteries advantageously use non-porous, selectively permeable separators including, without limitation:
a) $Ag_n O/KOH(30-45\%)/Zn$
b) $Ag_n O/KOH(50\%)/Cd$
c) $Ag_n O/KOH(30\%), LiOH(1.5\%)/Fe$
d) $C,Ag,Air/KOH/Zn$
e) $Ti,TiO_2.RuO_2.Cl_2.6H_2O/ZnCl_2(10\%)/Zn,C$
f) $C,Pt,Br_2/ZnBr_2/Zn, C$
g) $C,Pt,Br_2/HBr/H_2,Pt,C$
h) $FeCl_3.FeCl_2/TiCl_4.TiCl_3$
i) $K_3 Fe (CN)_6/KOH/Zn$
(In the above $Ag_n O$ signifies silver oxide in which silver has a valence between 1 and 2.)

In systems a), b), c), d) and i) cation selective barriers are preferred. These may be selectively permeable barriers as described above for electrolysis apparatus on for example microporous substrates of polysulfone, polyether sulfone, polypropylene or nylon having water insoluble barrier layers of, for example, sulfonated polysulfone, sulfonated polyether sulfone, polyethylene-co-methacrylic acid, polyethylene-co-acrylic acid, polystyrene-co-methacrylic acid, sulfonated ethylene-propylene-diene terpolymer, polybutadiene-co-methacrylic acid, polybutadiene-co-acrylonitrile-co-acrylic acid, sulfochlorinated polyethylene, polybutadiene-co-acrylic acid, polystyrene-co-acrylic acid, sulfonated butyl elastomer, sulfonated pentenamer, polystyrene-co-butadiene-co-acrylic acid and 4,4' azobis (4-cyanopentanoic acid) initiated butadiene-acrylonitrile telechelic elastomers. Such barrier layers can be applied to suitable emulsion treated microporous substrates by kiss-coating, dip-coating, roller coating and spraying from appropriate solutions. For example a microporous polysulfone substrate is treated with about a 1 percent aqueous dispersion of a ethylene-co-acrylic acid latex. A mixture of about 25 parts of linear polystyrene sulfonic acid and about 75 parts of vinyl chloride-acrylonitrile co-polymer is dissolved in a mixed cyclohexanone-methanol cosolvent. The solution is roll coated on the latex treated substrate and allowed to dry. Preferably the barrier layer faces the negative electrode, e.g. the Zn, Cd or Fe electrode.

In systems e) and h), barrier layers are preferred which are selectively permeable to anions. Particularly suitable are barrier layers prepared from fluorinated polyamines and/or fluorinated polyquaternary amines as disclosed in U.S. Pat. No. 4,661,231 and dissolved or dispersed in appropriate solvents such as Freon 114B2. Suitable for system h) barrier layers are also anion selective materials prepared as disclosed in U.S. Pat. No. 4,711,907; Japan Patent 52-52189; and U.S. Pat. No. 4,822,471 incorporated herein by reference for the purpose of teaching a method of manufacturing anion selective barrier layers having a high anion selectivity in acid solutions. Anion selective polymers prepared according to U.S. Pat. No. 4,711,907 or Japan Patent 52-52189 may for example be dissolved in suitable polar solvents e.g. dimethyl formamide, N-methyl pyrrolidone, sulfolan, N-methyl acetamide and/or N,N-dimethyl acetamide and roll coated or kiss-coated on a suitable microporous substrate pretreated with emulsion according to this invention. The solvent is then vaporized or extracted. Alternatively the anion selective precursor polymer (i.e. the polymer containing active halo moieties before amination) may be similarly dissolved in an appropriate solvent, coated on the microporous emulsion-treated substrate and then aminated after or during removal of the solvent. In the case of barrier layers prepared from anion selective materials according to U.S. Pat. No. 4,822,471, the microporous substrate e.g. microporous polysulfone may be saturated with a hot aqueous solution of agar containing a few percent of an appropriate emulsion e.g. a butadiene-styrene-vinyl pyridine terpolymer latex. After the agar saturated substrate is cooled and the agar sets to a gel, one surface may be coated with a mixture of about 50 parts of dimethylamino propyl methacrylamide, 50 parts of methylene-bis-methacrylamide and 2 parts of benzoin. The coating may be covered with cellophane or polyester film and the coating photopolymerized. The cellophane or polyester film may then be removed and the agar solubilized and removed in hot water.

Selectively Permeable Barriers Suitable for Dialysis Apparatus including Donnan Dialysis and Hemodialysis Apparatus Examples of the application of such apparatus are the recovery of free mineral acids from spent metal pickling liquor, the concentration of copper salts from the leaching of copper ores and the removal of low molecular weight impurities from human blood. In all of these cases the driving force for dialysis is primarily the concentration gradient across the barrier layer. The layer should therefore be as thin as possible. It must at the same time be free of defects. Suitable barriers may therefore advantageously be prepared from thin microporous substrates having a very thin selectively permeable barrier layer on one face. According to the present invention such substrate is treated with an appropriate dilute emulsion before or during establishment of the barrier layer. Barrier layers suitable for the recovery of free mineral acids from spent, metal pickling liquor may be prepared for example by saturating a polyethersulfone microporous substrate with an aqueous solution containing a few percent of polyethylenimine and about 1 percent (solid basis) of butadiene-styrene-vinyl pyridine latex particles. Excess aqueous solution is removed from the surface of the substrate and one such surface is contacted with a dilute solution of xylylene dichloride or dibromide in ether. The resulting interfacially cross-linked barrier layer is allowed to dry at room temperature or in an oven at about 80° C. for about 10 minutes for example. The polyethylenimine may be replaced in whole or in part with adducts of epichlorohydrin with ethylene diamine, 1,3-propylene diamine, hexamethylene diamine and the like. The xylylene dihalide may be replaced in whole or in part with polyvinyl benzyl halide or co- or ter- polymers of vinyl benzyl halide or with analogs of xylylene dihalides such as dichloromethyl diphenyl, dichloromethyl naphthalene and the like.

Barrier layers useful for the Donnan dialysis concentration of anions may be prepared as above. For concentration of cations useful barrier layers may be prepared e.g.

by dissolving about 3 parts of vinyl chloride-acrylonitrile-copolymer and 1 part of linear sulfonated polystyrene in a mixed cyclohexanone-methanol cosolvent, casting the solution in a thin layer on a glass plate and as such film begins to solidify pressing an emulsion treated microporous substrate into the film. The composite is then dried in an oven at about 50° C., cooled to room temperature and immersed in water. The barrier may then be removed from the glass plate.

dissolving a copolymer of about 10 mol percent perfluoro 4-methyl-3,6-dioxa-7 octene sulfonyl fluoride and 90 mol percent tetrafluoroethylene in Freon 114B2, roll coating the solution on microporous polyether sulfone which has been previously roll coated with a 1% aqueous dispersion of polytetrafluoroethylene latex and dried.

sulfonating ethylene-propylene-5-ethylidene-2-norbornene terpolymer and/or hydrogenated styrene-butadiene block copolymer (e.g. Kraton G, Shell Oil Co.) in dilute solution with appropriate sulfonating agents e.g. chlorosulfonic acid or sulfuric acid, recovering the sulfonated polymer and dissolving it in a non-hydrogen bonding polar solvent such as N,N-dimethyl formamide. The solution is cast as a thin film on a glass plate and as it solidifies an appropriate emulsion treated microporous substrate (for example, of polyether ether ketone) is pushed into the film. The film is then dried at about 80° C. in a vacuum oven. After cooling, the glass plate and barrier are soaked in water and then separated from each other. The degree of sulfonation of the polymers should be such that the water content of the polymer in equilibrium with water at the desired use temperature is in the range of from about 10 to about 20 percent by weight. This may be accomplished by blending suitable batches of sulfonated polymer or blending sulfonated polymer and non-sulfonated polymer in suitable mixed solvents.

The choice of barrier layers and substrates suitable for hemodialysis is more limited owing to the requirement for compatibility with human blood. Polysulfone, polytetrafluoroethylene, polycarbonate, polypropylene and regenerated cellulose are suitable for microporous substrates and regenerated cellulose and polycarbonate for the barrier layer. A cuprammonium cellulose casting solution may be spread in a thin film on a glass plate and an emulsion treated microporous regenerated cellulose substrate pushed into the thin film. The reverse side of the substrate should be immediately saturated with dilute sulfuric acid. The resulting composite should be thoroughly rinsed with sterile saline solution and subsequently separated from the plate. The skin side should contact the hemodialysing blood. Barrier layers which are blends of poly-N-vinyl pyrrolidone with regenerated cellulose or polycarbonate are also useful.

Selectively Permeable Barriers Suitable for Reverse Dialysis Apparatus

In such apparatus a barrier which is selectively permeable to low molecular weight electrolytes (relative to water or non-electrolytes) is contacted with a solution of such electrolytes under pressure. Low molecular weight electrolytes are more soluble in (i.e. more concentrated in) the effective barrier layer than in the ambient solution. Under the influence of the pressure gradient the solution permeating the brine layer is more concentrated than the higher pressure ambient solution. Suitable barrier layers comprise fine grained anion selective-cation selective mosaics, blends of cationic and anion polyelectrolytes and cationomer/anionomer copolymers (e.g. quaternized copolymers of 2-acrylamido-2-methyl-propane sulfonic acid or its salts (including its amine and quaternary ammonium salts) with 4-vinyl pyridine, 3-methacrylamidopropyl dimethyl amine and/or N,N-dimethyl aminoethyl methacrylate and/or their quaternary ammonium derivatives). For example, a polypropylene microporous sheet is saturated in a 1 percent butadiene-styrene latex, squeezed between rollers and allowed to dry. A film of concentrated butadiene-styrene latex is drawn on a glass plate and as it dries the microporous polypropylene sheet is pressed into it. The resulting sandwich is dried in an oven at 50° C., cooled to room temperature and the reverse side of the substrate saturated with a solution of titanium tetrachloride in ether to cyclize the latex. The composite is then contacted with a solution of octyl bromomethyl ether and anhydrous aluminum chloride in ethylene dichloride for about five hours, then rinsed in ethylene dichloride and in methanol and treated with a 30 percent aqueous solution of trimethyl amine. After rinsing with water, the structure is separated from the glass plate and the skin side saturated with an oxygen free 15 percent solution of the sodium salt of 2-acrylamido-2-methyl propane sulfonic acid in dimethyl formamide. The solution also contains about 0.1 gram azo-bis-isobutyronitrile per 100 ml. The excess solution is removed and the barrier sandwiched between polyester film and heated overnight in an oven at about 60° C. After cooling the film is removed and the composite rinsed thoroughly in water. It is suitable for the demineralization of dilute electrolyte solutions by reverse dialysis.

Examples of the present invention are hereinafter described but it will be noted that this invention is not limited thereto.

EXAMPLE 1

Preparation of Emulsion Treated Microporous Substrates

Part A

About 140 grams of Udel ™ 3500 polysulfone (Amoco Performance Products, Connecticut, U.S.A.) are dissolved in a mixture of about 430 ml each of N,N-dimethyl formamide and N-methyl pyrrolidone. A piece of densely woven polyester scrim fabric (Texlon ™ 0715, Texlon Corp., Torrence, Calif., U.S.A.) is moistened with a mixture of about 750 ml isopropanol and about 250 ml deionized water and wiped very dry with lint-free absorbent cloth. The scrim fabric is then coated with about 7 mils of the polysulfone solution at a rate of about 15 feet per minute and then immersed for about 5 minutes in deionized water containing about 1 percent Hycar ™ Latex H2679 Goodrich Rubber Co., Akron, Ohio, U.S.A.). Thereafter the polysulfone coated fabric was thoroughly rinsed in tap water.

Part B

The above procedure is repeated omitting the latex emulsion from the deionized water. After thorough rinsing in tap water the substrate is dried, saturated with a 1% solution of Geon ™ Latex 460X46 (Goodrich Rubber Co., Akron, Ohio U.S.A.).

Part C

A casting solution is prepared consisting of about 18 parts by weight of polyvinylidene fluoride (Kynar ™, Penn Salt Manufacturing Co., U.S.A.) and 82 parts N-Methyl pyrrolidone. 0.5 ppm of ammonium hydroxide are added. The solution is cast as a liquid film 24 mil thick on a clean glass plate and after 20 seconds immersed in a solution prepared from 500 ml each of methanol and deionized water and 10 ml of Dow 238A latex emulsion (Dow Chemical Co., Midland, Mich., U.S.A.). The resulting substrate is thoroughly rinsed in tap water and dried.

Part D

The above procedure is repeated omitting the latex emulsion from the methanol-water mixture. After thorough rinsing in tap water, the substrate is dried, saturated with a 1% solution of Dow 238A latex emulsion in deionized water.

EXAMPLE 2

Preparation of A Selectively Permeable Barrier Suitable for Reverse Osmosis Apparatus Part A A substrate is prepared in accordance with Example 1, Part A. It is impregnated with an aqueous solution containing 0.25% each polyvinyl alcohol and piperazine and 0.5% sodium hydroxide. The impregnated substrate is contacted on one surface for about 20 seconds with a hexane solution containing about 0.5% of benzene-1,3,5-tricarboxylic acid chloride, removed from said contact and then allowed to age for about 72 hours at about 22° C.

Part B

A substrate is prepared in accordance with Example 1 Part B except the post-treatment with latex emulsion is omitted. The substrate is impregnated with the aqueous solution of Part A of this example to which 0.5% Dow Latex 238A has been added. The thus impregnated substrate is subsequently contacted on one surface for about 20 seconds with the hexane solution of Part A of this example, removed from said contact and then allowed to age for about 72 hours at about 22° C.

Part C

Part B of this example is repeated omitting the addition of latex emulsion.

It is found that there are substantially more defects in membranes prepared in accordance with Part C of this example than in membranes prepared in accordance with Parts A or B.

EXAMPLE 3

Preparation of A Selectively Permeable Barrier Suitable for Gas Separation Apparatus Part A A casting solution is prepared consisting of a mixture of about 40 parts by volume of formamide and about 50 parts of acetone containing about 10 weight/volume percent cellulose acetate. A substrate prepared according to Example 1 Part B is masked with carboxy methyl cellulose, immersed in the casting solution and then withdrawn at a rate of 1 cm per minute; thereafter allowing the solvent to evaporate. The barrier is subsequently rinsed thoroughly with tap water and is found to be useful in the separation of carbon dioxide from nitrogen.

Part B

A substrate is prepared in accordance with Example 1 Part B except the post-treatment with latex emulsion is omitted. The substrate is dip-coated as described in Part A of this example.

It is found that there are substantially more defect in the membranes prepared in accordance with Part B of this example than in membranes prepared in accordance with Part A.

EXAMPLE 4

Preparation of A Selectively Permeable Barrier Suitable for Pervaporation Apparatus Part A Viscose cellulose casting solution is spread on a clean glass plate to a thickness of about 10 mils. A microporous substrate prepared as in Example 1 Part D is pressed into the cast solution and the glass plate, cast solution and substrate are immersed in a 10 percent solution of sulfuric acid for about 5 minutes. The barrier with attached cellulose barrier layers is removed from the glass plate and rinsed thoroughly with tap water. It is found to be useful for breaking the ethanol-benzene azeotrope in pervaporation apparatus.

Part B

A substrate is prepared in accordance with Example 1 Part D except the post-treatment with latex emulsion is omitted. The substrate is dip-coated as described in Part A of this example.

It is found that there are substantially more defects in the membranes prepared in accordance with Part B than in membranes prepared in accordance with Part A.

EXAMPLE 5

Selectively Permeable Barriers Suitable for Electrodialysis Apparatus

Part A

A solution of 5 weight/volume % each of cellulose acetate and tetrahexyl ammonium iodide is prepared in an approximately 40:60 by volume mixture of formamide and acetone. A substrate prepared in accordance with Example 1 Part B is masked with a solution of carboxymethyl cellulose, immersed in the formamide acetone solution and withdrawn vertically at a rate of about one cm per minute. After evaporation of the solvent, the barrier is rinsed thoroughly with tap water. It is found to be useful as an anion exchange membrane in an electrodialysis apparatus for the selective removal of nitrate from softened, potable water at current densities which are substantially less than the Cowan-Brown limiting current density.

Part B

The procedure of Part A of this example is repeated omitting the treatment of the substrate with latex.

It is found that there are substantially fewer defects in the membranes prepared in accordance with Part A of this example as compared to those prepared in accordance with Part B.

EXAMPLE 6

Selectively Permeable Barriers Suitable for Electrolysis Apparatus

Part A

A microporous perfluorocarbon substrate obtained from W. L. Gore Inc. of Maryland, U.S.A. (said to have been prepared by biaxial stretching of a polytetrafluoroethylene sheet) is immersed in a 5% by weight emulsion of polytetrafluoroethylene removed and allowed to dry. A copolymer having about 20 mol percent methyl perfluoro-5-oxa-6-heptenoate and about 80 mol percent tetrafluoroethylene is dispersed in Freon 114B2 by ball milling. The resulting solution is coated as a thin layer on aluminum foil and the substrate evenly pressed into the thin layer. The Freon is allowed to evaporate and the resulting composite structure is heated for about 5 minutes at 260° C. The barrier is useful in an electrolysis apparatus for the electrolysis of pure sodium chloride brine to caustic and chlorine.

Part B

The procedure of Part A is repeated except the treatment of the substrate with polytetrafluoroethylene latex is omitted.

It is found that there are substantially fewer defects in the membranes prepared in accordance with Part A as compared to those prepared in accordance with Part B.

EXAMPLE 7

Selectively Permeable Barriers Suitable for Primary and/or Secondary Electric Batteries Part A A mixture of about 25 parts of linear polystyrene sulfonic acid and 75 parts of vinyl chloride-acrylonitrile copolymer is dissolved in a mixed cyclohexanone-methanol cosolvent. The mixture is roll-coated on a substrate prepared in accordance with Example 1 Part B and allowed to dry. The barrier is thoroughly rinsed with deionized water. It is found to be useful as a selective barrier in a secondary battery having one compartment comprising a graphite electrode and an aqueous electrolyte comprising potassium ferricyanide and the other compartment comprising a zinc metal alloy electrode and an aqueous electrolyte comprising potassium hydroxide.

Part B

The procedure of Part A is repeated except the treatment of the substrate with latex is omitted. It is found that there are substantially fewer defects in the membranes prepared in accordance with Part A as compared to those prepared in accordance with Part B.

EXAMPLE 8

Substantially Permeable Barriers Suitable for Dialysis Apparatus

Part A

A cuprammonium cellulose solution is coated as a thin layer on a clean glass plate. A substrate prepared in accordance with Example 1 Part D is pressed into the thin layer. The glass plate, thin layer and substrate are immersed in 6% sulfuric acid for five minutes after which the substrate and composite barrier layer are removed from the glass plate, washed thoroughly in deionized water and then in a dilute solution of pharmaceutical grade sodium bicarbonate in pure water. The resulting barrier is found to be useful in hemodialysis apparatus.

Part B

The above procedure is repeated except the latex treatment of the substrate is omitted.

It is found that there are substantially fewer defects in the barriers prepared in accordance with Part A as compared with those prepared in accordance with Part B.

EXAMPLE 9

Substantially Selectively Permeable Barriers Suitable for Piezodialysis Apparatus Part A A Celgard TM microporous polypropylene sheet (Celanese Corp., U.S.A.) is mounted in a Buechner funnel and wetted with a 1% dispersion of Dow 238A latex (Dow Chemical Co., Midland, Mich., U.S.A.). The dispersion is drawn through the substrate by vacuum. A film of butadiene-styrene latex as supplied is drawn on a glass plate and as it dries the microporous polypropylene sheet is pressed into it. The resulting sandwich of glass plate, latex film and substrate is dried in an oven at 50° C., cooled to room temperature and the reverse (open) side of the substrate saturated with a solution of titanium tetrachloride in ether to cyclize the latex. The composite is then contacted with a solution of octyl bromoethyl ether and anhydrous aluminum chloride in ethylene dichloride for about five hours, rinsed in ethylene dichloride and in methanol and then treated with a 30 percent aqueous solution of trimethyl amine. After rinsing with water, the structure is separated from the glass plate and the skin side saturated with an oxygen free 15 percent solution of the sodium salt of 2-acrylamido-2-methyl propane sulfonic acid in dimethyl formamide. The latter solution also contains about 0.1 gram azo-bis-isobutyronitrile per 100 ml. The excess solution is removed and the barrier sandwiched between polyester films and heated overnight in an oven at about 60° C. After cooling the polyester films are removed and the composite rinsed thoroughly in water. It is found to be useful for the partial demineralization and softening of potable water by piezodialysis.

Part B

The above procedure is repeated except the latex treatment of the substrate is omitted.

It is found that there are substantially more defects in the barriers prepared in accordance with Part B as compared with those prepared in accordance with Part A.

EXAMPLE 10

A porous polyether sulfone substrate film on a woven polyester support fabric was evenly coated (by immersion) with an aqueous phase solution containing 0.75% by weight of the reducing latex butadiene-styrene latex polymer solids (DOW 238A), 0.25% by weight of the amino compound piperazine, and 0.5% by weight of sodium hydroxide. It was then immersed for 30 seconds in the organic phase solution, that is, a n-hexane solution of 1% crosslinkers i.e. 0.4% by weight of trimesoyl chloride and 0.6% by weight of isophthaloyl chloride. The substrate was removed, allowed to dry in air and then allowed to set overnight at room temperature. The resulting thin film-latex impregnated composite membrane was tested in a stirred R.O. test cell at 60 psi using a 300 ppm NaCl solution and also a test using 150 ppm $MgSO_4$ solution. The flux rate was measured in gallons of solution per sq. ft. of membrane per day (GFD).

EXAMPLE 11

A composite membrane was fabricated using the same procedure as described in Example 10 except no emulsion latex polymer of any kind was added to the aqueous reactant solution.

EXAMPLE 12

A composite membrane was fabricated using the same procedure as described in Example 10 except the emulsion reducing latex polyisoprene (General Latex Corp.) replaced the butadiene-styrene latex.

EXAMPLE 13

A composite membrane was fabricated using the same procedure as described in Example 10 except the emulsion latex Geon Vinyl Chloride latex (B. F. Goodrich #460×46 replaced the butadiene styrene latex.

This latex contains no carbon-carbon double bonds in its structure.

EXAMPLE 14

A composite membrane was fabricated using the same procedure as described in Example 10 except the emulsion latex Hycar 2679 (an acrylic esters polymeric latex) [B. F. Goodrich #2679] replaced the butadiene-styrene latex. This latex also contains no carbon-carbon double bonds in its structure.

Each of the above TFC membranes of Examples 10 through 14 were tested over a 32 day period for:
1. Rejection and water flux in treating a 300 ppm NaCl solution in the presence of 200 ppm (maintained) chlorine at a pH range between 4.5 and 5.5.
2. Same as above except a 150 ppm $MgSO_4$ solution was used.
3. Temperature of test was 20° C.±2° C.

| Example | Emulsions used in AQ. Phase | Initial % Rejection 300 ppm NaCl | | 32 Day % Rejection 300 ppm NaCl | | Initial % Rejection 150 ppm $MgSO_4$ | | 32 Day % Rejection 150 ppm $MgSO_4$ | |
|---|---|---|---|---|---|---|---|---|---|
| | | Flux | (GFD) | Flux | (GFD) | Flux | (GFD) | Flux | (GFD) |
| 10 | Polystyrene-Butadiene | 86% | (15) | 50% | (55) | 94% | (21) | 56% | (55) |
| 11 | None | 50% | (9) | 3% | (482) | 69% | (11) | 2% | (511) |
| 12 | Polyisoprene | 65% | (17) | 48% | (59) | 80% | (22) | 69% | (51) |
| 13 | Geon-Vinyl Chloride | 53% | (22) | 4% | (377) | 51% | (18) | 1% | (472) |
| 14 | Hycar-Acrylic esters | 76% | (18) | 8% | (307) | 87% | (19) | 5% | (289) |

All of above exposures were at 150,000 ppm-hrs. of chlorine

The table shows that those TFC membranes prepared with reducing latexes were much improved in their tolerances to chlorine contained in the feed solutions to be treated. The improvements, in terms of salt rejections were in the order of at least 10 fold.

Various modifications may be made to the procedures described herein as would be obvious to one having the ordinary skill in the art and such modifications are considered to be included within the scope of the invention, most especially those involving the use of emulsion having reducing polymers in the aqueous reaction bath heretofore described which is described by the claims appended hereto. Various features of the invention are set forth in the claims which follow.

I claim:

1. A process for forming a microporous membrane which process comprises contacting a solution comprising one or more polymers in a first liquid, said solution being in the form of a tube or sheet, with a second liquid which second liquid is a substantial solvent for at least part of said first liquid and substantially a non-solvent for at least one of said polymers, said second liquid comprising a suspension or emulsion comprising as the disperse phase particles of one or more carbon compounds which are solids at room temperature and substantially insoluble in said second liquid.

2. A process according to claim 1 in which said one or more polymers is selected from the group consisting of polysulfones, polyarylsulfones, polyether sulfones, polyphenyl sulfones, polypropylene, cellulose, polycarbonates, polyphenylene oxides, polyvinyl chlorides, cellulose nitrates, cellulose acetate-nitrate, polyvinylidene fluorides, polytetrafluoroethylene-coethylene, derivatives of said members of the group and mixture thereof.

3. A process according to claim 1 in which said one or more carbon compounds is a polymer of one or more monomers selected from the group consisting of butadiene, acrylonitrile, styrene, isoprene, vinyl pyridine, vinyl chloride, vinyl acetate, vinylidene chloride, acrylic monomers, vinyl fluoride, vinylidene fluoride, tetrafluorethylene and ethylene.

4. A selectively permeable barrier for separating a fluid mixture into less permeable and more permeable fractions said barrier comprising in whole or in part a microporous membrane prepared in accordance with claim 1.

5. Apparatus for separating a fluid mixture into less permeable and more permeable fractions, said apparatus containing at least a selectively permeable barrier which barrier comprises in whole or in part a microporous membrane prepared in accordance with claim 1.

6. A process for separating a fluid mixture into less permeable and more permeable fractions, said process comprising contacting said fluid mixture with a selectively permeable barrier which barrier comprises in whole or in part a microporous membrane prepared in accordance with claim 1.

7. A process for substantially selectively removing nitrate from water, said process comprising flowing said water through the diluting compartments of an electrodialysis stack in which at least one of the anion selective barriers thereof comprises a microporous substrate prepared in accordance with claim 1 and having on the dilute stream side thereof a barrier layer substantially selective for the removal of nitrate compared to the other ionic species of the same charge sign.

8. Apparatus for substantially selectively removing nitrate from water, said apparatus comprising an electrodialysis stack in which at least one of the anion selective barriers thereof comprises a microporous substrate prepared in accordance with claim 1 and having on the dilute stream side thereof a barrier layer substantially selective for the removal of nitrate compared to other ionic species of the same charge sign.

9. A process for forming a semipermeable non-porous membrane comprising contacting a microporous substrate with a liquid suspension the disperse phase of which comprises particles of at least one solid substantially insoluble in the dispersing phase, such liquid suspension also comprising dissolved components capable of reacting with one or more other components not present in said liquid suspension to form a non-porous, semi-permeable film and subsequently contacting said substrate with a fluid comprising said one or more other components, said fluid characterized by being substantially insoluble in said liquid suspension, said the dispersing phase in said liquid suspension characterized by being substantially insoluble in said fluid.

10. A selectively permeable barrier for separating a fluid mixture into less permeable and more permeable fractions prepared in accordance with claim 9.

11. Apparatus for separating a fluid mixture into less permeable and more permeable fractions, said apparatus comprising a selectively permeable barrier prepared in accordance with claim 9.

12. A process for separating a fluid mixture into less permeable and more permeable fractions, said process comprising contacting said fluid mixture with a selectively permeable barrier prepared in accordance with claim 9.

13. A process for separating a fluid mixture into less permeable and more permeable fractions comprising contacting said fluid mixture with one surface of a selectively permeable barrier prepared by contacting a microporous membrane with a first liquid comprising a suspension or emulsion which suspension or emulsion comprises as the disperse phase particles of one or more compounds which are solids at room temperature and substantially insoluble in said first liquid, said first liquid also comprising one or more moieties selected from the group consisting of polyethylenimines; reaction products of ethylene diamine, piperazine, methyl piperazine, and/or dimethyl piperazines with a polyepihalohydrin;
  phenylene diamines;
  xylylene diamines;
  chlorophenylene diamines;
  benzene triamines;
  bis(aminobenzyl) aniline;
  tetraaminobenzenes;
  piperazine;
  methyl piperazine;
  dimethyl piperazines;
  homopiperazine;
  N,N'-diphenylethylene diamine;
  aminobenzamides;
  aminobenzhydrazides; and
  bis(alkylamino)phenylene diamines
and subsequently contacting said microporous membrane with a second liquid comprising one or more moieties selected from the group consisting of
  phthaloyl halides;
  benzene tricarboxylic acid halides;
  cyclohexane tricarboxylic acid halides;
  pyridine dicarboxylic acid halides;
  trimellitic anhydride acid halides;
  sebacic acid halides;
  azelaic acid halides;
  adipic acid halides;
  dodecanedioic acid halides;
  toluene diisocyanate;
  methylene bis(phenylisocyanates);
  polymethylene bis(phenylisocyanates);
  naphthalene diisocyanates;
  bitolyene diisocyanates;
  hexamethylene diisocyanate; and
  phenylene diisocyanates,
creating a pressure difference through said selectively permeable barrier in a direction to urge said more permeable fraction from said one surface of said selectively permeable barrier through said selectively permeable barrier and recovering separately said less permeable and more permeable fractions.

14. Reverse osmosis apparatus containing at least a selectively permeable barrier, said barrier prepared by contacting a microporous membrane with a first liquid comprising a suspension or emulsion which suspension or emulsion comprises as the disperse phase particles of one or more carbon compounds which are solids at room temperature and substantially insoluble in said first liquid, said first liquid also comprising one or more moieties selected from the group consisting of
  polyethylenimines;
  reaction products of ethylene diamine, piperazine, methyl
  piperazine and/or dimethyl piperazines with a
  polyepihalohydrin;
  phenylene diamines;
  xylylene diamines;
  chlorophenylene diamines;
  benzene trimines;
  bis(aminobenzyl)aniline;
  tetraamino benzenes;
  piperazine;
  methyl piperazine;
  dimethyl piperazines;
  homopiperazine;
  N,N'-diphenyl ethylene diamine;
  aminobenzamides;
  aminobenzhydrazides; and
  bis(alkylamino)phenylene diamines
and subsequently contacting said microporous membrane with a second liquid comprising one or more moieties selected from the group consisting of
  phthaloyl halides;
  benzene tricarboxylic acid halides;
  cyclohexane tricarboxylic acid halides;
  pyridine dicarboxylic acid halides;
  trimellitic anhydride acid halides;
  sebacic acid halides;
  azelaic acid halides;
  adipic acid halides;
  dodecanedioic acid halides;
  toluene diisocyanate;
  methylene bis(phenylisocyanates);
  polymethylene bis(phenylisocyanates);
  naphthalene diisocyanates;
  bitolyene diisocyanates;
  hexamethylene diisocyanate; and
  phenylene diisocyanates.

15. Apparatus for the electrolysis of chlorine brine to caustic and chlorine, said apparatus comprising a microporous substrate having on and/or in only one surface thereof a non-porous, thin, dense barrier layer selectively permeable for alkali metal cations, said barrier layer comprising a hydrolyzed copolymer of at least one monomer selected from the group consisting of alkyl perfluoro-oxa-alkenoates, alkyl perfluor-dioxa-alkenoates, perfluoro-oxa-alkenesulfonyl halides, perfluoro-dioxa-alkene sulfonyl halides, derivatives of said group and mixtures thereof, the other surface of said substrate being substantially free of said hydrolyzed polymer.

16. A process for electrolyzing chloride brine to caustic and chlorine, said process comprising contacting said brine with the barrier layer of a microporous substrate having on and/or in only one surface thereof a non-porous, thin, dense barrier layer selectively permeable for alkali metal cations, said barrier layer comprising a hydrolyzed copolymer of at least one monomer selected from the group consisting of alkyl perfluoro-oxa-alkenoates, alkyl perfluoro-dioxa-alkenoates, perfluoro-oxa-alkenesulfonyl halides, perfluoro-dioxa-alkene sulfonyl halides, derivatives of said group and mixtures thereof, the other surface of said substrate being substantially free of said hydrolyzed polymer and passing a substantially direct electric current through said brine and said barrier layer.

* * * * *